(12) United States Patent
Fuchs et al.

(10) Patent No.: US 12,705,089 B1
(45) Date of Patent: Aug. 11, 2026

(54) SYSTEMS AND METHODS FOR COMPONENT LEVEL APPLICATION MIGRATION

(71) Applicant: Wells Fargo Bank, N.A., San Francisco, CA (US)

(72) Inventors: Maximilian Fuchs, Charlotte, NC (US); Matthew Spain, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 788 days.

(21) Appl. No.: 18/159,541

(22) Filed: Jan. 25, 2023

(51) Int. Cl.
*G06F 9/46* (2006.01)
*G06F 9/48* (2006.01)

(52) U.S. Cl.
CPC .......... *G06F 9/4875* (2013.01); *G06F 9/4831* (2013.01)

(58) Field of Classification Search
CPC ............................. G06F 9/4875; G06F 9/4831
See application file for complete search history.

(56) References Cited

U.S. PATENT DOCUMENTS 1,013,367 A 1/1912 Blakeslee et al.
8,745,233 B2 6/2014 Bartfai-Walcott et al.
9,565,129 B2 2/2017 Bai et al.
9,680,696 B1 6/2017 Firment et al.
9,722,858 B2 8/2017 Markley et al.
10,419,546 B2 9/2019 Sharma et al.
11,068,641 B1 * 7/2021 Wu ...................... G06N 3/0464
2020/0267055 A1 8/2020 Vibhor et al.
2022/0121482 A1 * 4/2022 Kumar .................... G06F 9/485
2022/0334870 A1 * 10/2022 Chen ..................... G06F 9/4856

* cited by examiner

*Primary Examiner* — Tammy E Lee
(74) *Attorney, Agent, or Firm* — K&L Gates LLP

(57) ABSTRACT

Systems, apparatuses, methods, and computer program products are disclosed for generating a dynamic prioritized list of migration tasks for an application. An example method includes identifying, by an application discovery engine and for an application, a set of application components, and generating, by a migration engine, a set of migration tasks based on the set of application components. The example method also includes determining, by a task prioritization analysis engine, a task priority score for each migration task in the set of migration tasks, and determining, by the migration engine, a hierarchical ordering for each migration task of the set of migration tasks. The example method also includes generating, based on the hierarchical ordering and a task priority score for each migration task, the dynamic prioritized list of migration tasks, wherein the dynamic prioritized list of migration tasks comprises an ordered sequence of a subset of migration tasks.

20 Claims, 9 Drawing Sheets

SYSTEMS AND METHODS FOR COMPONENT LEVEL APPLICATION MIGRATION

BACKGROUND

Migrating applications to new platforms is often necessary to reduce costs and simplify operations. However, planning the process of migrating a system of interdependent applications at various states of readiness presents a significant organizational challenge.

BRIEF SUMMARY

The migration of applications to new platforms is a necessary but resource-intensive task for organizations seeking to modernize application infrastructures. Often, organizations wish to migrate legacy applications to cloud platforms to reduce operating costs and improve flexibility and reliability of services. Legacy applications may be built with a specific platform in mind, or may have been developed without the ability to migrate to new platforms.

Migrating applications to new platforms, such as cloud platforms, typically requires significant investment from developers to update critical components of the legacy applications. For example, legacy applications may have poorly maintained or multiple codebases that need to be revised and merged so that a one-to-one relationship between codebases and applications is maintained. Other issues may include applications with undocumented or implied dependencies that need to be made explicit through a package manager or other system for managing dependencies. Furthermore, challenges such as the example issues raised here must be discovered, tracked, and solved manually, creating an additional administrative and organizational workload that compounds the difficulty of performing the migration itself.

In contrast to these conventional techniques for application migration, example embodiments described herein analyze systems and applications to generate prioritized lists of migration tasks, breaking the migration process into a manageable checklist. Example embodiments may automate the process of collecting application information to plan migration tasks. The migration tasks may be organized and ordered based on dependencies, analysis of the costs and benefits of each individual step of the migration, and the like.

Accordingly, the present disclosure sets forth systems, methods, and apparatuses that enable organizations to migrate applications to new platforms. By optimizing the migration process, smaller organizations with less capacity to manage application migrations may be able to take advantage of new computing platforms, such as cloud computing platforms. Larger organizations may likewise complete such migrations more efficiently with significant cost savings due to the decreased need for manual intervention at each stage of the migration.

In one example embodiment, a method is provided for generating a dynamic prioritized list of migration tasks for an application. The method includes identifying, by an application discovery engine and for an application, a set of application components; generating, by a migration engine, a set of migration tasks based on the set of application components; determining, by a task prioritization analysis engine, a task priority score for each migration task in the set of migration tasks; determining, by the migration engine, a hierarchical ordering for each migration task of the set of migration tasks; and generating, by the migration engine and based on the hierarchical ordering and a task priority score for each migration task, the dynamic prioritized list of migration tasks, where the dynamic prioritized list of migration tasks comprises an ordered sequence of a subset of migration tasks.

In another example embodiment, an apparatus is provided for apparatus for generating a dynamic prioritized list of migration tasks for one or more applications. The apparatus includes an application discovery engine configured to identify, for each application, a set of application components; a migration engine configured to generate a set of migration tasks based on the set of application components; and a task prioritization analysis engine configured to determine a task priority score for each migration task in the set of migration tasks; where the migration engine is further configured to determine a hierarchical ordering for each migration task of the set of migration tasks, and generate, based on the hierarchical ordering and a task priority score for each migration task, the dynamic prioritized list of migration tasks, wherein the dynamic prioritized list of migration tasks comprises an ordered sequence of a subset of migration tasks.

In another example embodiment, a computer program product is provided for generating a dynamic prioritized list of migration tasks for one or more applications. The computer program product includes at least one non-transitory computer-readable storage medium storing software instructions that, when executed, cause an apparatus to identify, for an application, a set of application components; generate a set of migration tasks based on the set of application components; determine a task priority score for each migration task in the set of migration tasks; determine a hierarchical ordering for each migration task of the set of migration tasks; and generate, based on the hierarchical ordering and a task priority score for each migration task, the dynamic prioritized list of migration tasks, wherein the dynamic prioritized list of migration tasks comprises an ordered sequence of a subset of migration tasks.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
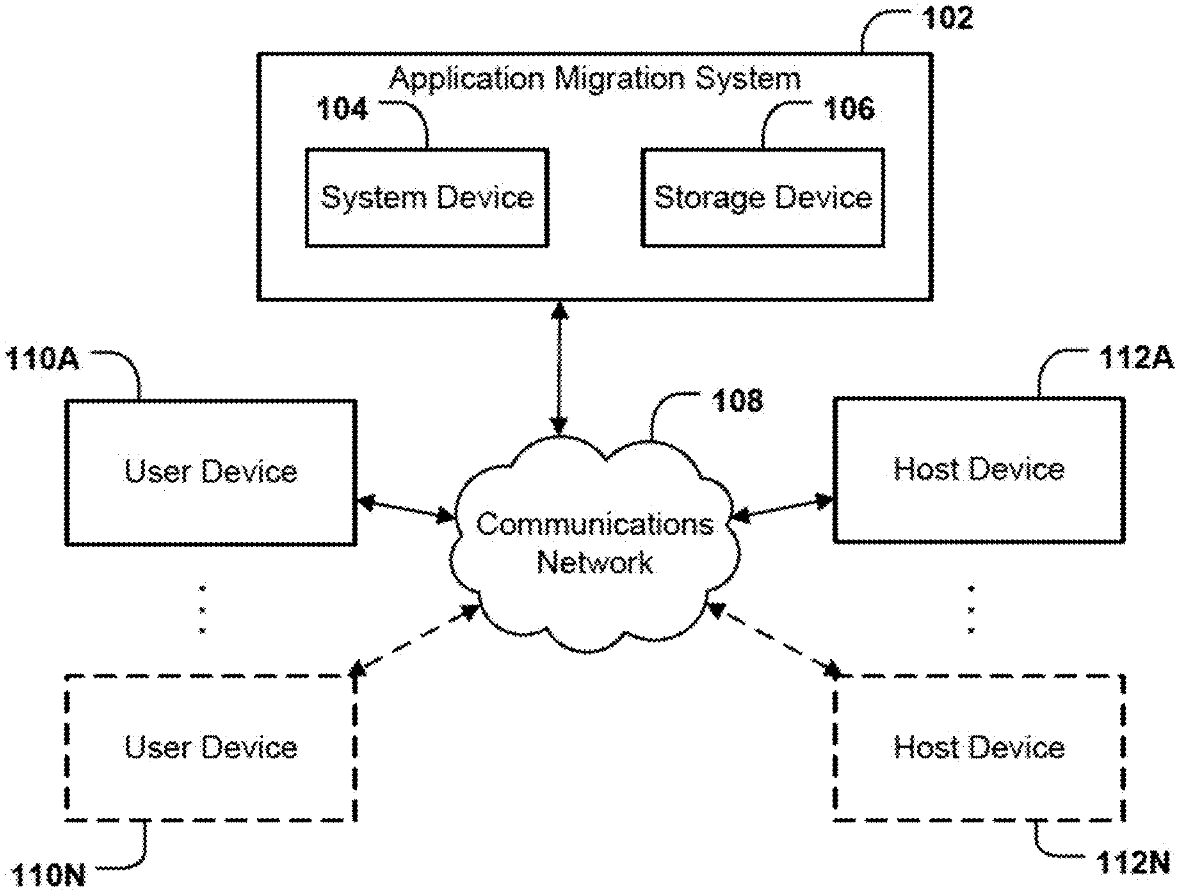
FIG. 1 illustrates a system in which some example embodiments may be used for component level application migration.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "platform" may refer to a data construct configured to describe the environment in which an application is executed or is anticipated to be executed. Example designations of platforms include particular operating systems, computing hardware, virtual machines, and the like. Platforms may include cloud computing platforms, where components of the platform are hosted by a remote provider, or locally hosted devices and services.

The term "application component" may refer to a data construct configured to describe a discrete element of an application. An application component may be associated with an application component type. Application component types may include an application code snippet, an application function, an application programming interface element, a sub-application, a complete application, and/or the like. Each application component may refer to a discrete element of the application and may range in size from an individual code snippet of an application up to the entire application itself. In some embodiments, an application component may be separated from other application components and migrated as an individual unit. An application component may be determined using application inventory data, which may be received from one or more application discovery tools.

The term "migration task" may refer to data construct configured to describe a measurable goal that enables deployment of the application to a platform and may be associated with one or more application components. Each migration task may be associated with an inferred unit of effort. A migration task may be a relatively large project that encompasses migration of an entire application, or may be a smaller project that encompasses individual goals within the larger migration project. In some embodiments, a migration task may be automated. Automated migration tasks may be tasks that do not require continual input from developers or other users, but may require an initial configuration and/or activation command. In some embodiments, the automated migration tasks may be automatically executed without the need for any manual input (e.g., no requirement for an initial configuration and/or activation command). The preferences for the level of manual input for each automated migration task may be set by authorized users such as system administrators for each migration task, for each application, or for the system as a whole. In some embodiments, a migration task may be user interactable. User interactable tasks may require user interaction beyond an initial configuration and activation. For example, user interactable tasks may require the user to perform the particular migration task manually. In some embodiments, one or more migration tasks of the set of migration tasks are generated using a trained migration machine learning model. Additionally or alternatively, one or more migration tasks of the set of migration tasks may be required migration tasks such that these migration tasks are always added to the set of migration tasks.

Once a migration task is complete, a task status update indication may be received. The task status update indication corresponds to a migration task of the set of migration tasks and comprises a status update relating to the corresponding migration task. A status update may be indicative of the status of the migration task. A status may include a "complete" status, an "in progress" status, a "not started" status, a "failed" status, an "intervention needed" status, and/or the like. A task status update indication may be generated in response to an indication of user input for a migration task if the migration task is an interactable migration task. Alternatively, a task status update indication may be generated in response to causing execution of the migration task if the migration task is an automated migration task. In some embodiments, the dynamic prioritized list of migration tasks may include the status for a given migration task.

The term "migration metadata" may refer to a data construct configured to describe data collected during execution of migration tasks, including data related to the duration and costs associated with the migration task, including hardware, software, operations, administration, downtime, and the like. Migration metadata may further include data describing the application component being migrated, such as the vendor, licensing of the application component, application component type, size or other metrics of the codebase, and the like. In some embodiments, the migration metadata may be generated based on one or more task status update indications. For example, a task status update indication may update the status of a given migration task to "complete" such that the time to completion, user intervention, computational resources used, errors, and/or the like that occurred between the time period when the status was "not started" until "complete" occurred. As another example, a task status update indication may update the status of a given migration task to "failed" such that the time consumed, user intervention, computational resources used, errors, and/or the like that occurred between the time period when the status was "not started" until "failed" occurred. The migration metadata may also indicate the one or more issues that occurred for the migration task which resulted in the "failed" status.

The term "migration task determination model" may refer to a data construct that is configured to describe parameters, hyper-parameters, and/or stored operations of a model to process a set of application components to generate one or more migration tasks. In some embodiments, the migration task determination model is a trained machine learning model. In particular, the migration task determination model may be a neural network (e.g., feedforward artificial neural network (ANN), multilayer perceptron (MLP), attention-based models, etc.) and/or a classification machine learning model (e.g., random forest, etc.). The migration task determination model may be trained based at least in part on historical migration metadata for previously migrated application. Alternatively, the migration task determination model may be a rules-based model configured to follow a defined set of rules and/or operations to generate one or more migration tasks. In some embodiments, the migration task determination model may be a hybrid model which uses both machine learning model techniques and rules-based model techniques. For example, the migration task determination model may be configured to evaluate whether a given application component is compatible with rules or requirements by a target platform. If the migration task determination model identifies one or more incompatibilities or inferred mismatches between a given application component and a requirement for the given component in the target platform, the migration task determination model may generate one or more migration tasks that address the mismatch between the current configuration of the application component and the required configuration of the application component as required by the target platform, either via machine learning techniques or via a rules-based model. In some embodiments, the migration model uses to process an application component may be based on an application component type.

The term "task prioritization determination model" may refer to a data construct that is configured to describe parameters, hyper-parameters, and/or stored operations of a model to process a set of migration tasks to generate a task priority score for each migration task. The task prioritization determination model may be a trained machine learning model, such as a neural network (e.g., feedforward ANN, MLP, attention-based models, etc.) and/or a regression machine learning model (e.g., ordinal regression). Alternatively, the task prioritization determination model may be a rules-based model configured to follow a defined set of rules and/or operations to determine a task priority score for each migration task. For example, the task prioritization determination model may follow a set of rules which describe conditions for a migration task where each rule is associated with an intermediate score (e.g., +/−0.5) and the migration score is assigned an initial task priority score (e.g., 0). The task priority score may then be determined based on the summation of each intermediate score for the migration task and the initial task priority score. The task priority score may be an inferred numerical value that estimates the migration task's advantage relative to other migration tasks. The task priority score may be determined based on a list of factors, which describe a readiness of a particular application component to be migrated to a target platform. For example, the task prioritization determination model may penalize migration tasks that require extensive manual intervention, have significant risk, and/or have low impact upon completion while rewarding migration tasks that are automated or require minimal manual intervention, have low risk of failure, and/or provide greater benefits upon completion. Migration tasks involving applications or application components that are well-suited to migration to the target platform may have generally higher task priority scores, as determined by the task prioritization determination model.

The term "dependency determination model" may refer to a data construct that is configured to describe parameters, hyper-parameters, and/or stored operations of a model to process a set of migration tasks to generate a hierarchical ordering for each migration task. The dependency determination model may be a trained machine learning model, such as a neural network (e.g., graph neural network (GNN)). Alternatively, the dependency determination model may be a rules-based model (e.g., a tree-based model) configured to follow a defined set of rules and/or operations to determine a hierarchical ordering for each migration task. In some embodiments, the dependency determination model may be configured to evaluate each migration task to determine whether it depends on one or more other migration tasks within the set of migration tasks and/or whether it depends on one or more other conditions or criteria being fulfilled prior to being able to be executed successfully (e.g., requires user permissions). In some embodiments, the dependency determination model may be configured to generate a directed graph of migration tasks which describe the dependency relationships of each migration task. The directed graph of migration tasks may include nodes which represent each migration tasks and the nodes may be connected by one or more edges. The edges represent a relationship between the connected nodes, and in the directed graph, each edge has a direction, pointing to one of the nodes to which it is connected. The directed graph may have any number of nodes and edges, and each node may be connected to any other nodes by any number of edges. The hierarchical ordering may be determined based on the directed graph of migration tasks. The dependency determination model may output the hierarchical ordering as an array where the stored elements within the position indices of the array are ordered based on the depth, height, branch depth, etc. of each node within the directed graph of migration tasks.

The term "output model" may refer to a data construct that is configured to describe parameters, hyper-parameters, and/or stored operations of a model to process a set of migration tasks, each task priority score, and a hierarchical ordering to generate a dynamic prioritized list of migration tasks. The dynamic prioritized list of migration tasks describes a set of tasks to be performed for an application prior to migrating the application to a new platform. In some embodiments, the dynamic prioritized list may be list migration tasks ordered according to a hierarchical ordering and based on an associated task priority score indicative of an inferred priority for a respective task. The hierarchical ordering may inform the order of tasks in the prioritized list by accounting for task interdependencies. For example, a set of migration tasks may include task A, task B, and task C where task B is dependent on task A (e.g., task A must be completed before task B can be completed). In one example, task B may be determined to have the highest task priority score, followed by task C, and then task A. Here, since task Bis associated with the highest task priority score, the dynamic prioritized list of migration tasks may list task A followed by task C initially since task B is unavailable (e.g., due to its dependence on task A). Once task A is complete, the dynamic prioritized list of migration tasks may be updated to list task B followed by task C due to the higher task priority score associated with task B as compared to task C. In some embodiments, the dynamic prioritized list of migration tasks may list currently unavailable migration tasks (e.g., task A in the previous example) such that the dynamic prioritized list of migration tasks depicts all migration tasks for an application. Currently unavailable migration tasks may not be interactable (e.g., by a user to perform manually or by a computer to perform automatically) to avoid errors or other issues.

System Architecture

Example embodiments described herein may be implemented using any of a variety of computing devices or servers. To this end, FIG. 1 illustrates an example environment within which various embodiments may operate. As illustrated, an application migration system 102 may include a system device 104 in communication with a storage device 106. Although system device 104 and storage device 106 are described in singular form, some embodiments may utilize more than one system device 104 and/or more than one storage device 106. Additionally, some embodiments of the application migration system 102 may not require a storage device 106 at all. Whatever the implementation, the application migration system 102, and its constituent system device(s) 104 and/or storage device(s) 106 may receive and/or transmit information via communications network 108 (e.g., the Internet) with any number of other devices, such as one or more of user device 110A through user device 110N and/or host device 112A through host device 112N.

System device 104 may be implemented as one or more servers, which may or may not be physically proximate to other components of application migration system 102. Furthermore, some components of system device 104 may be physically proximate to the other components of application migration system 102 while other components are not. System device 104 may receive, process, generate, and transmit data, signals, and electronic information to facilitate the operations of the application migration system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the application migration system 102. Storage device 106 may store information relied upon during operation of the application migration system 102, such as various application data that may be used by the application migration system 102, data and documents to be analyzed using the application migration system 102, or the like. In addition, storage device 106 may store control signals, device characteristics, and access credentials enabling interaction between the application migration system 102 and one or more of the user devices 110A-110N or host devices 112A-112N.

The one or more user devices 110A-110N and host devices 112A-112N may be embodied by any computing devices known in the art, such as desktop or laptop computers, tablet devices, smartphones, or the like. The one or more user devices 110A-110N and the one or more host devices 112A-112N need not themselves be independent devices, but may be peripheral devices communicatively coupled to other computing devices.

In some embodiments, one or more of host devices 112A-112N may serve as an infrastructure layer that is configured to provide one or more cloud computing platforms, which serve one or more applications. The cloud computing platform may be a private cloud accessible only to certain parties over a private internet, a public cloud accessible to any party over the public internet, or a hybrid cloud which has elements of both a public cloud and a private cloud.

Although FIG. 1 illustrates an environment and implementation in which the application migration system 102 interacts with one or more of user devices 110A through 110N and/or host devices 112A through 112N, in some embodiments users may directly interact with the application migration system 102 (e.g., via input/output circuitry of system device 104), in which case a separate user device 110 may not be utilized. Whether by way of direct interaction or via a separate user device 110, a user may communicate with, operate, control, modify, or otherwise interact with the application migration system 102 to perform the various functions and achieve the various benefits described herein.

Example Implementing Apparatuses

Figure 2:
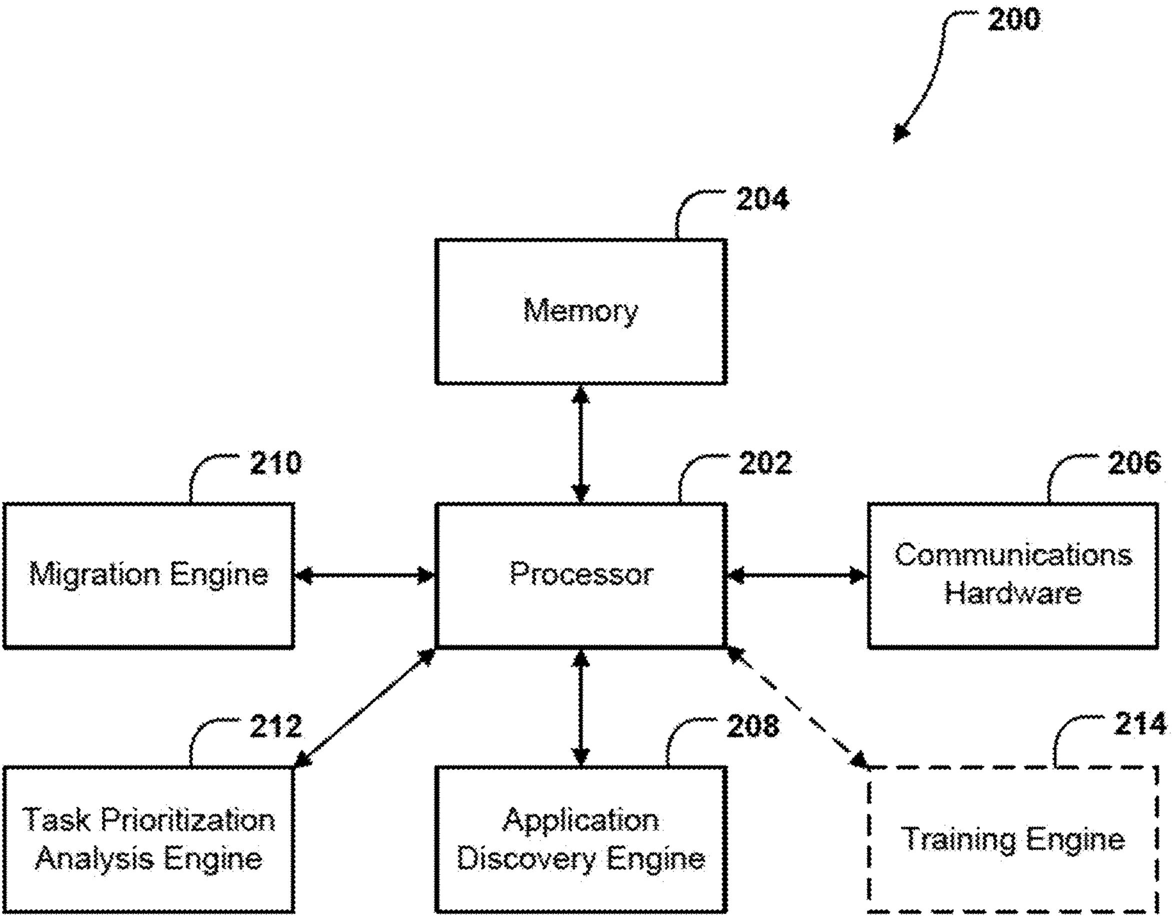
FIG. 2 illustrates a schematic block diagram of example circuitry embodying a device that may perform various operations in accordance with some example embodiments described herein.

System device 104 of the application migration system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, application discovery engine 208, migration engine 210, task prioritization analysis engine 212, and training engine 214, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 6A-6B and 7A-7B.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202. In some embodiments, communications hardware 206 is configured to provide the dynamic prioritized list of migration tasks.

In addition, the apparatus 200 further comprises an application discovery engine 208 that generates application inventory data. The application discovery engine 208 may utilize processor 202, memory 204, or any other hardware component included in the apparatus 200 to perform these operations, as described in connection with FIGS. 6A-6B and 7A-7B below. The application discovery engine 208 may further utilize communications hardware 206 to gather data from a variety of sources (e.g., host device 112A through host device 112N or storage device 106, as shown in FIG. 1), and/or exchange data with a user, and in some embodiments may utilize processor 202 and/or memory 204 to generate application inventory data.

In addition, the apparatus 200 further comprises a migration engine 210 that generates a set of migration tasks generated based on the set of application components and/or determines a hierarchical ordering for each migration task. Additionally, the migration engine 210 may generate the dynamic prioritized list of migration tasks based on the hierarchical ordering and associated task priority scores for each migration task. The migration engine 210 may utilize processor 202, memory 204, or any other hardware component included in the apparatus 200 to perform these operations, as described in connection with FIGS. 6A-6B and 7A-7B below. The migration engine 210 may further utilize communications hardware 206 to gather data from a variety of sources (e.g., host device 112A through host device 112N or storage device 106, as shown in FIG. 1), and/or exchange data with a user, and in some embodiments may utilize processor 202 and/or memory 204 to generate one or more of the sets of migration tasks. In particular, the migration engine may access a migration determination model, which may be stored in storage device 106 and/or externally, to generate the set of migration tasks. Additionally, the migration engine may access a dependency determination model, which may be stored in storage device 106 and/or externally, to determine a hierarchical ordering and/or directed graph of migration tasks. Furthermore, the migration engine may access an output model, which may be stored in storage device 106 and/or externally, to generate the dynamic prioritized list of migration tasks.

In addition, the apparatus 200 may further comprise a task prioritization analysis engine 212 that generates task valuation data from migration tasks. The task prioritization analysis engine 212 may utilize processor 202, memory 204, or any other hardware component included in the apparatus 200 to perform these operations, as described in connection with FIGS. 6A-6B and 7A-7B below. The task prioritization analysis engine 212 may further utilize communications hardware 206 to gather data from a variety of sources (e.g., host device 112A through host device 112N or storage device 106, as shown in FIG. 1), and/or exchange data with a user, and in some embodiments may utilize processor 202 and/or memory 204 to generate task valuation data. In particular, the task prioritization analysis engine may access a task prioritization determination model, which may be stored in storage device 106 and/or externally, to determine task priority scores for the set of migration tasks.

In addition, the apparatus 200 may further comprise a training engine 214 that trains a machine learning model based on application data. The training engine 214 may utilize processor 202, memory 204, or any other hardware component included in the apparatus 200 to perform these operations, as described in connection with FIGS. 6A-6B and 7A-7B below. The training engine 214 may further utilize communications hardware 206 to gather data from a variety of sources (e.g., host device 112A through host device 112N or storage device 106, as shown in FIG. 1), and/or exchange data with a user, and in some embodiments may utilize processor 202 and/or memory 204 to train one or more models (e.g., migration determination model, task prioritization determination model, dependency determination model, and/or output model).

Although components 202-214 are described in part using functional language, it will be understood that the particular implementations necessarily include the use of particular hardware. It should also be understood that certain of these components 202-214 may include similar or common hardware. For example, the application discovery engine 208, migration engine 210, task prioritization analysis engine 212, and training engine 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the application discovery engine 208, migration engine 210, task prioritization analysis engine 212, and training engine 214 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the application discovery engine 208, migration engine 210, task prioritization analysis engine 212, and training engine 214 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third-party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Operations

Figure 6A:
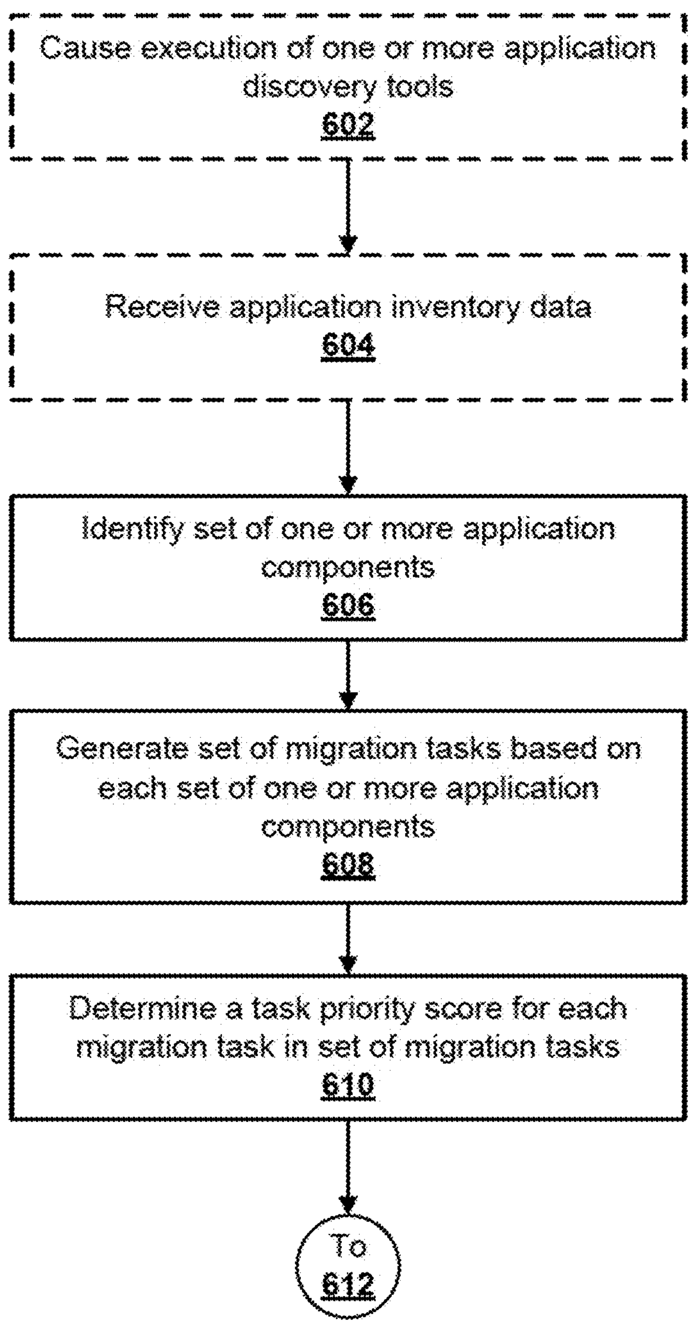
FIG. 6A illustrates an example flowchart for generating a dynamic prioritized list of migration tasks, in accordance with some example embodiments described herein.
Figure 6B:
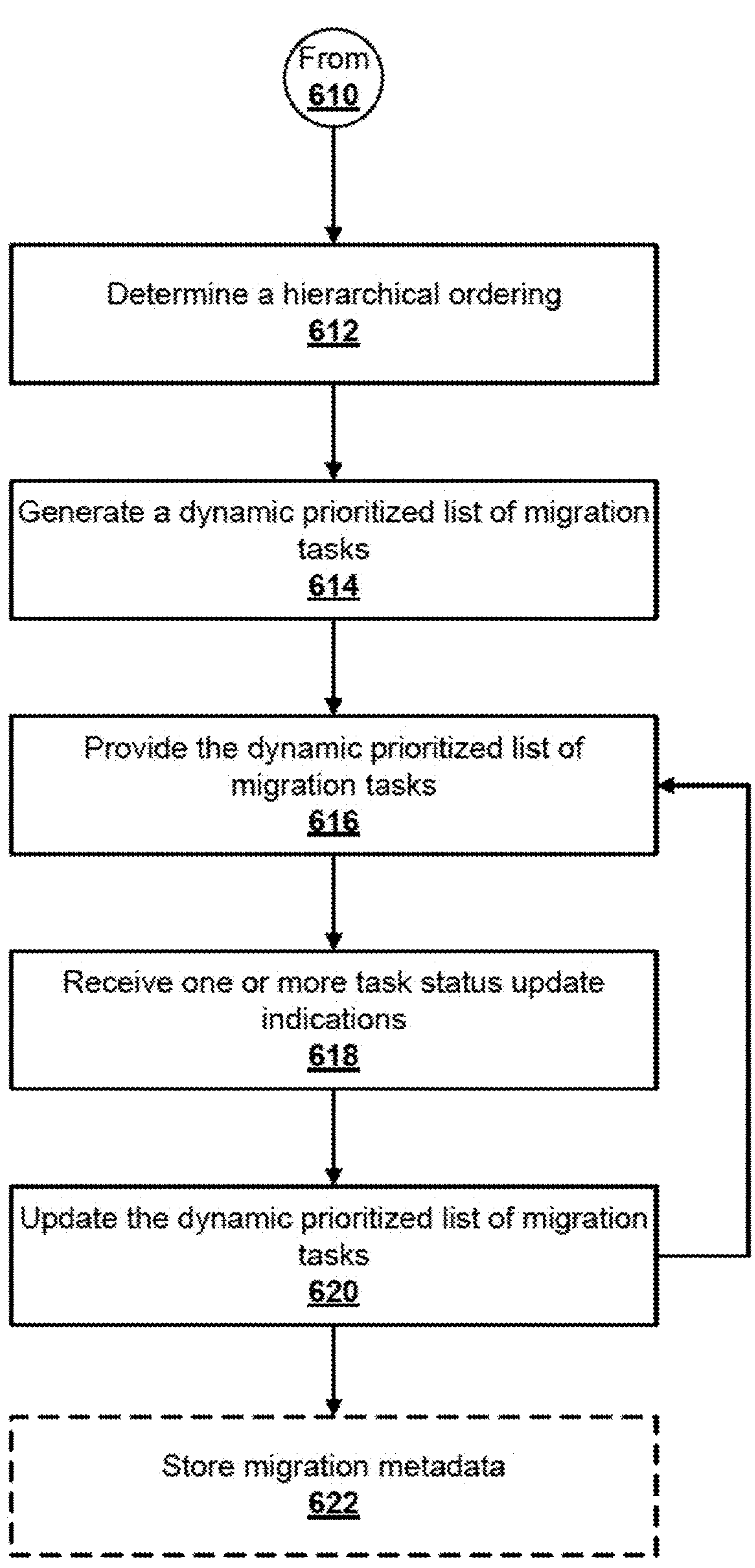
FIG. 6B illustrates an example flowchart for generating a dynamic prioritized list of migration tasks, in accordance with some example embodiments described herein.

Turning to FIGS. 6A-6B, example flowcharts are illustrated that contain example operations implemented by example embodiments described herein. The operations illustrated in FIGS. 6A-6B may, for example, be performed by system device 104 of the application migration system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, application discovery engine 208, migration engine 210, task prioritization analysis engine 212, training engine 214, and/or any combination thereof. It will be understood that user interaction with the application migration system 102 may occur directly via communications hardware 206, or may instead be facilitated by a separate user device 110, as shown in FIG. 1, and which may have similar or equivalent physical componentry facilitating such user interaction. Although operations are described for an application, it will be appreciated by one of skill in the art, that the following operations may be performed for any number of applications.

Turning first to FIG. 6A, example operations are shown for generating a prioritized list of migration tasks for one or more applications. As shown by operation 602, the apparatus 200 may include means, such as processor 202, memory 204, application discovery engine 208, or the like, for causing execution of one or more application discovery tools. The application discovery engine 208 may be configured to perform application discovery itself, or may utilize application discovery tools stored in memory 204 or other storage. The application discovery tools may collect application inventory data, and may generate a catalog of applications that exist within a predefined domain, such as a storage element, a server, a network, an organization, or the like. The application discovery engine 208 may search volatile and/or non-volatile memory 204 or other storage, examining file systems, operating system registries, log files, processes loaded into volatile memory, or the like. The search may also include organizational data, such as records from previous application migrations, records from information technology departments, or other database information. The application inventory data generated by application discovery may include information regarding the technical requirements of deployed applications, including usage of volatile or non-volatile memory 204 or other storage, usage of processor 202 or other computing resources, age of the application and frequency of updates, the number and frequency of users of the application, or other related data. The application inventory may also include the capabilities of applications, dependencies of various applications and connections to other software, and organizational information such as a measure of the importance and risk of the application to the organization's operation.

As shown by operation 604, the apparatus 200 may include means, such as, processor 202, memory 204, communications hardware 206, or the like, for receiving application inventory data. The application inventory data, described above, may be received from application discovery tools that generate the application inventory data as part of an application discovery procedure. The communications hardware 206 may receive the application inventory data via a network connection in instances where the application discovery tools are executed on a remote host, or via a bus or other internal communications of the apparatus 200 in instances where the application discovery tools are executed locally. The application inventory data may be further stored in memory 204 or other storage to be archived and accessed by subsequent processes.

As shown by operation 606, the apparatus 200 includes means, such as, processor 202 memory 204, application discovery engine 208, or the like, for identifying a set of application components for an application. In some embodiments, the application discovery engine 208 may identify an application based on the application inventory data received in operation 604. Each application component may refer to a discrete element of the application and may range in size from an individual code snippet of an application up to the entire application itself. In some embodiments, an application component may be separated from other application components and migrated as an individual unit. In some embodiments, the application discovery engine 208 may prioritize identifying the smallest discrete application components that can be individually identified and potentially migrated. The application discovery engine 208 may identify the set of one or more application components by recording the location of executable files on a filesystem of memory 204, the location in a code repository, the location of application library files on a filesystem of memory 204, or the like. The recorded data may be associated individual application components from the set of one or more application components. The application discovery engine 208 may further record additional metadata related to each application component relevant to migration. For example, the application discovery engine 208 may record additional data obtained during the execution of application discovery tools such as information regarding the technical requirements of deployed applications, including usage of volatile or non-volatile memory 204 or other storage, usage of processor 202 or other computing resources, age of the application and frequency of updates, the number and frequency of users of the application, or other related data. In some embodiments, the application discovery engine 208 may process or parse application inventory data to generate metadata related to each application component.

In some embodiments, an application component may be associated with an application component type. Application component types may include an application code snippet, an application function, an application programming interface element, a sub-application, a complete application, and/or the like.

As shown by operation 608, the apparatus 200 includes means, such as processor 202, memory 204, migration engine 210, or the like, for generating a set of migration tasks based on the set of application components. A migration task may describe a measurable goal that enables deployment of the application to a platform and may be associated with one or more application components. A platform may be an environment in which an application is executed. Example designations of platforms include information on particular operating systems, computing hardware, virtual machines, and the like. Platforms may include cloud computing platforms, where components of the platform are hosted by a remote provider, or locally hosted devices and services.

Each migration task may be associated with an inferred unit of effort. A migration task may be a relatively large project that encompasses migration of an entire application, or may be a smaller project that encompasses individual goals within the larger migration project. As a first example, a database application may be migrated from a legacy platform to a select cloud platform. As such, one migration task in the first example may be migrating the entirety of the database application to the select cloud platform (e.g., the target platform). As a second example, the migration of a database application may be subdivided into several migration tasks, such as upgrading the logging services of the database application, adding the use of environmental variables to the database application, and the like.

In some embodiments, a migration task may be automated. Automated migration tasks may be tasks that do not require continual input from developers or other users, but may require an initial configuration and/or activation command. In some embodiments, the automated migration tasks may be automatically executed without the need for any manual input (e.g., no requirement for an initial configuration and/or activation command). The preferences for the level of manual input for each automated migration task may be set by authorized users such as system administrators for each migration task, for each application, or for the system as a whole. In some embodiments, a migration task may be user interactable. User interactable tasks may require user interaction beyond an initial configuration and activation. For example, user interactable tasks may require the user to perform the particular migration task manually. In some embodiments, one or more migration tasks of the set of migration tasks are generated using a trained migration machine learning model. Additionally or alternatively, one or more migration tasks of the set of migration tasks may be required migration tasks such that these migration tasks are always added to the set of migration tasks.

The migration engine 210 may generate the set of migration tasks by receiving the set of one or more application components as input, and processing each application component to generate a migration task. The generation of the set of migration tasks may take into account the type of each application component from the set of application components and other elements from the metadata for each application component described above. The migration engine 210 may interpret each application component to determine if one or more migration tasks may be generated. In some embodiments, the set of migration tasks includes migrating a candidate application component to a target platform. In some embodiments, additional migration tasks may be generated that do not directly correspond to an application component. For example, installation of a prerequisite software library that provides services for one or more application components on the target platform may be added as a migration task. In some embodiments, a particular application component may be determined to already be available on the target platform, and no migration task may be generated for the particular application component.

In some embodiments, the set of migration tasks includes testing a candidate application component on a target platform. The migration engine 210 may cause benchmarks or other tests to be conducted on the target platform or a host device 112, and may receive data regarding the testing via communications hardware 206. The testing may measure the compatibility and/or performance of the application or application components on the target platform.

In some embodiments, the migration engine may use a migration task determination model to generate one or more migration tasks for the set of migration tasks. In some embodiments, the migration task determination model is a trained machine learning model. In particular, the migration task determination model may be a neural network (e.g., feedforward artificial neural network (ANN), multilayer perceptron (MLP), attention-based models, etc.) and/or a classification machine learning model (e.g., random forest, etc.). The migration task determination model may be trained based at least in part on historical migration metadata for previously migrated application. Alternatively, the migration task determination model may be a rules-based model configured to follow a defined set of rules and/or operations to generate one or more migration tasks. In some embodiments, the migration task determination model may be a hybrid model which uses both machine learning model techniques and rules-based model techniques. For example, the migration task determination model may be configured to evaluate whether a given application component is compatible with rules or requirements by a target platform. If the migration task determination model identifies one or more incompatibilities or inferred mismatches between a given application component and a requirement for the given component in the target platform, the migration task determination model may generate one or more migration tasks that address the mismatch between the current configuration of the application component and the required configuration of the application component as required by the target platform, either via machine learning techniques or via a rules-based model. In some embodiments, the migration model uses to process an application component may be based on an application component type.

In some embodiments, in the instance the migration task determination model uses machine learning model techniques, the migration task determination model may be configured to classify each application component into a satisfactory classification or unsatisfactory classification. Application components with an unsatisfactory classification may be processed further to identify one or more migration tasks for the application component. In particular, the migration task determination model may evaluate the effect of one or more modified configurations of an application component to determine one or more migration tasks using any suitable algorithm such as k-nearest neighbors (KNN), k-means clustering, imputation methods, etc. In some embodiments, the modification configuration parameter of the application component which are most closely associated with requirement configuration parameters (e.g., associated with the lowest penalties) may be evaluated to determine if the application component into a satisfactory classification. In the instance the modified configuration parameter does result in a satisfactory classification, the migration determination machine learning model may generate one or more migration tasks based on the modified configuration parameter.

Additionally or alternatively, in the instance the migration task determination model uses rules-based model techniques, the migration task determination model may be configured to follow the set of rules and/or operations based on the configuration of each application component to determine one or more migration tasks. For example, the migration task determination model may be a tree-based model configured with one or more decision nodes describing a particular condition or application component configuration and one or more leaf nodes describing one or more migration tasks. Each decision node may be connected to one or more other decision nodes and/or one or more leaf nodes via edges. Each edge may be configured to describe a particular outcome from a connected decision node such that the migration task determination model may evaluate the application component and follow the decision nodes of the tree to reach one or more leaf nodes and generate one or more migration tasks based on migration tasks described by the one or more leaf nodes.

As shown by operation 610, the apparatus 200 may include means, such as processor 202, memory 204, communications hardware 206, task prioritization analysis engine 212, or the like, for determining a task priority score for each migration task in the set of migration tasks. The task priority score may be an inferred numerical value that estimates the migration task's advantage relative to other migration tasks. The task priority score may be determined based on a list of factors, which describe a readiness of a particular application component to be migrated to a target platform. For example, the task prioritization determination model may penalize migration tasks that require extensive manual intervention, have significant risk, and/or have low impact upon completion while rewarding migration tasks that are automated or require minimal manual intervention, have low risk of failure, and/or provide greater benefits upon completion. Migration tasks involving applications or application components that are well-suited to migration to the target platform may have generally higher task priority scores, as determined by the task prioritization determination model.

The task prioritization analysis engine 212 may compute the task priority score based on factors including various inputs from the application inventory data, metadata from the application components and migration tasks, and/or external data received from communications hardware 206. Factors from external data may include data about the network or computing environment of the platform on which the application components operate or the target platform to which the application components are planned to migrate, and may also include records, databases, spreadsheets, or other information provided by an organization, such as system administrators or other users.

In some embodiments, the list of factors includes an assessment of risk involved in migrating the particular application to the target platform. The assessment of risk may be conducted externally and stored on a host device 112 or other storage. In some embodiments, the task prioritization analysis engine 212 may perform the assessment of risk by evaluating data related to the application and the target platform.

In some embodiments, the task prioritization analysis engine 212 may be configured to use a task determination prioritization model to process a set of migration tasks to generate a task priority score for each migration task. The task prioritization determination model may be a trained machine learning model, such as a neural network (e.g., feedforward ANN, MLP, attention-based models, etc.) and/or a regression machine learning model (e.g., ordinal regression). Alternatively, the task prioritization determination model may be a rules-based model configured to follow a defined set of rules and/or operations to determine a task priority score for each migration task. For example, the task prioritization determination model may follow a set of rules which describe conditions for a migration task where each rule is associated with an intermediate score (e.g., +/−0.5) and the migration score is assigned an initial task priority score (e.g., 0). The task priority score may then be determined based on the summation of each intermediate score for the migration task and the initial task priority score. The task priority score may be determined based on a list of factors, which describe a readiness of a particular application component to be migrated to a target platform. For example, the task prioritization determination model may penalize migration tasks that require extensive manual intervention, have significant risk, and/or have low impact upon completion while rewarding migration tasks that are automated or require minimal manual intervention, have low risk of failure, and/or provide greater benefits upon completion.

In some embodiments, the task prioritization determination model may use one or more factors as parameters to be evaluated and may assign an intermediate numerical score to each factor. The mapping of factors to numerical scores may operate based on a pre-determined mapping (e.g., if the task prioritization determination model is a rules-based model) or may use a classifier model to assign numerical scores (e.g., if the task prioritization determination model is a machine learning model). The numerical scores for each factor may be collected and used to compute a task priority score for a migration task, for example, by applying a pre-determined weight to the numerical score obtained from each factor and summing the weighted scores together. The task priority scores, together with details of the computation, may be stored with memory 204 or other storage for updating computations in later operations, or used as training data for later models.

Turning now to FIG. 6B, as shown by operation 612, the apparatus 200 may include means, such as processor 202, memory 204, migration engine 210, or the like, for generating a hierarchical ordering for each migration task. The hierarchical ordering may be configured to describe a data structure that is configured to describe an associated order for each migration task relative to the other migration tasks. In some embodiments, the migration engine 210 may be configured to use a dependency determination model to generate the hierarchical ordering.

In some embodiments, the migration engine 210 may be configured to use the dependency determination model to generate a directed graph of migration tasks. The directed graph of migration tasks may describe the dependency relationships of each migration task. The directed graph of migration tasks may include nodes which represent each migration tasks and the nodes may be connected by one or more edges. The edges represent a relationship between the connected nodes, and in the directed graph, each edge has a direction, pointing to one of the nodes to which it is connected. The directed graph may have any number of nodes and edges, and each node may be connected to any other nodes by any number of edges. The migration engine 210 may analyze the set of migration tasks, including any links between tasks, user input data for user interactable tasks, metadata collected for each migration task, or other relevant information to generate the directed graph of migration tasks. The migration engine 210 may represent dependencies between two migration tasks as edges. For example, an application component installed in a first task may require a library installed as part of a second task. The migration engine 210 may connect the first task to the second task, with the edge directed towards the second task to indicate the first task has a dependency on the second task.

The dependency determination model may be a trained machine learning model, such as a neural network (e.g., graph neural network (GNN)). Alternatively, the dependency determination model may be a rules-based model (e.g., a tree-based model) configured to follow a defined set of rules and/or operations to determine a hierarchical ordering for each migration task. In some embodiments, the dependency determination model may be configured to evaluate each migration task to determine whether it depends on one or more other migration tasks within the set of migration tasks and/or whether it depends on one or more other conditions or criteria being fulfilled prior to being able to be executed successfully (e.g., requires user permissions).

The dependency determination model may then be configured to generate a hierarchical ordering, which may be output as an array. For example, in some embodiments, each node in the directed graph of migration tasks is assigned a node identifier which uniquely identifies the node from the other nodes in the directed graph of migration tasks. The dependency determination model may output the hierarchical ordering as an array where the stored elements within the position indices of the array are ordered based on the depth, height, branch depth, etc. of each node within the directed graph of migration tasks.

Figures 3A, 3B:
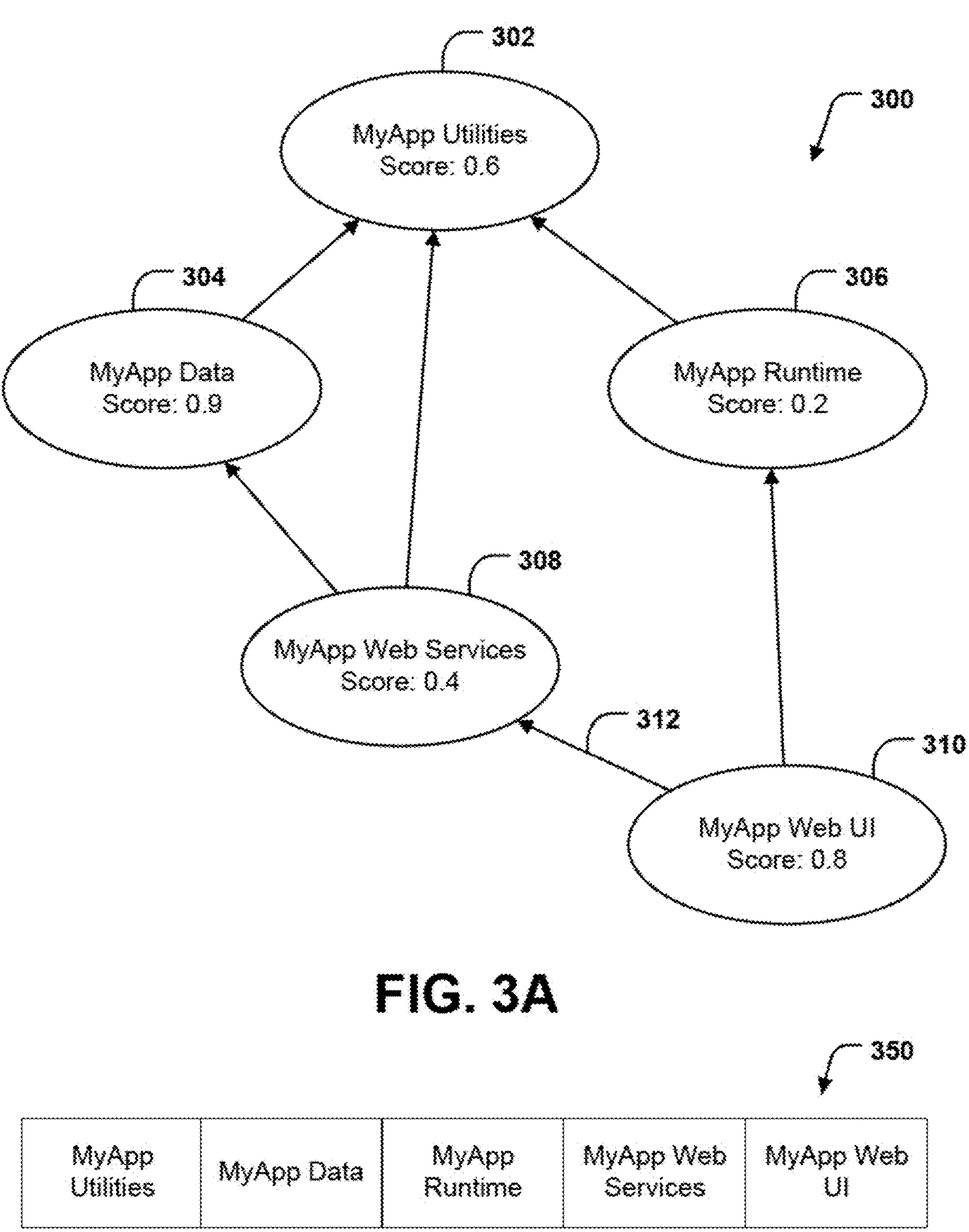
FIG. 3A illustrates an example directed graph used in some example embodiments described herein.
FIG. 3B illustrates an example hierarchical used in some example embodiments described herein.

Turning to FIG. 3A, an example depiction of a directed graph of migration tasks 300 is shown for migrating application components of an example application, "MyApp." The example directed graph depicts a migration task for each application component, MyApp Utilities 302, MyApp Data 304, MyApp Runtime 306, MyApp Web Services 308, and MyApp Web UI 310. Each example migration task is also shown with an example task priority score. Edge 312 indicates a dependency of MyApp Web UI 310 on MyApp Web Services 308. Some migration tasks may have multiple dependencies, for example MyApp Web Services 308 depends on both MyApp Utilities 302 and MyApp Data 304. Some migration tasks may be depended upon by multiple migration tasks, for example, MyApp Utilities 302 is a dependency of MyApp Data 304, MyApp Web Services 308, and MyApp Runtime 306.

Turning to FIG. 3B, an example depiction of an example hierarchical ordering 350 is shown for the directed graph of migration tasks 300. As shown in the hierarchical ordering 350, the order of the hierarchical ordering 350 is based on the associated dependencies of each node within the directed graph of migration tasks 300. For example, the node MyApp Utilities 302 is not dependent on any other migration task and thus is listed first in the hierarchical ordering 350. Nodes MyApp Data 304 and MyApp Runtime 306 are both dependent on MyApp Utilities 302 and are thus listed second and third in the hierarchical ordering 350, respectively. Node MyApp Web Services 308 is dependent on MyApp Utilities 302 and MyApp Data 304, which is dependent on MyApp Utilities 302 and is thus listed fourth in the hierarchical ordering 350. Node MyApp Web UI 310 is dependent on MyApp Runtime 306, which is dependent on MyApp Utilities 302 and MyApp Web Services 308, which is dependent on MyApp Web Services 308, which is dependent on MyApp Utilities 302 and MyApp Data 304, and is thus listed fifth in the hierarchical ordering 350.

Returning to FIG. 6B, as shown by operation 614, the apparatus 200 includes means, such as processor 202, memory 204, migration engine 210, or the like, for generating a dynamic prioritized list of migration tasks. The dynamic prioritized list of migration tasks may include an ordered sequence of a subset of migration tasks, ordered according to an inferred task priority. The dynamic prioritized list of migration tasks describes a set of tasks to be performed for an application prior to migrating the application to a new platform. In some embodiments, the dynamic prioritized list of migration tasks may be list migration tasks ordered according to a hierarchical ordering and based on an associated task priority score indicative of an inferred priority for a respective task. In some embodiments, the dynamic prioritized list of migration tasks may also include an indication of a status of a particular migration task. Task statuses may include, but are not limited to, a "complete" status, an "in progress" status, a "not started" status, a "failed" status, an "intervention needed" status, and/or the like.

In some embodiments, the migration engine 210 may use an output model to generate the dynamic prioritized list of migration tasks. The output model may be configured to process the set of migration tasks, each task priority score, and a hierarchical ordering to generate a dynamic prioritized list of migration tasks. The hierarchical ordering may inform the order of tasks in the prioritized list by accounting for task interdependencies. For example, a set of migration tasks may include task A, task B, and task C where task B is dependent on task A (e.g., task A must be completed before task B can be completed). In one example, task B may be determined to have the highest task priority score, followed by task C, and then task A. Here, since task B is associated with the highest task priority score, the dynamic prioritized list of migration tasks may list task A followed by task C initially since task B is unavailable (e.g., due to its dependence on task A). Once task A is complete, the dynamic prioritized list of migration tasks may be updated to list task B followed by task C due to the higher task priority score associated with task B as compared to task C. In some embodiments, the dynamic prioritized list of migration tasks may list currently unavailable migration tasks (e.g., task A in the previous example) such that the dynamic prioritized list of migration tasks depicts all migration tasks for an application. Currently unavailable migration tasks may not be interactable (e.g., by a user to perform manually or by a computer to perform automatically) to avoid errors or other issues.

As shown by operation 616, the apparatus 200 includes means, such as processor 202, migration engine 210, communications hardware 206 or the like, for providing the dynamic prioritized list of migration tasks. The communications hardware 206 may provide the dynamic prioritized list to one or more users, such as one or more system administrators, supervisors, software engineers, etc. In some embodiments, the dynamic prioritized list of migration tasks provided may be associated with a set of permissions that are configured based on the particular user the dynamic prioritized list of migration tasks is provided to. For example, since the dynamic prioritized list of migration tasks is interactable by users, only certain authorized users (e.g., software engineers) may be granted view and edit permissions to allow the user to interact with the dynamic prioritized list of migration tasks while other users (e.g., administrators) may only be granted view permissions such that they cannot interact with the dynamic prioritized list of migration tasks. As such, this prevents errors from unauthorized parties from accidentally or mistakenly updating an interactable migration task from the dynamic prioritized list of migration tasks.

As shown by operation 618, the apparatus 200 includes means, such as migration engine 210, communications hardware 206 or the like, for receiving one or more task status update indications. The communications hardware 206 may receive a task status update indication via a network interface, or directly to the apparatus 200 via one or more attached input devices. The task status update indication may be passed to other circuitry of the apparatus 200 to update the status of migration tasks. The user input received by the communications hardware 206 may include information needed to configure certain tasks or may infill missing information that was unable to be obtained automatically from the applications, target platform, and/or other information sources. The communications hardware 206 may prompt the user to provide input for each required piece of information.

In some embodiments, if a task status update indication describes a "failed" status or an "intervention needed" status, the migration engine 210 may generate one or more notifications for one or more users to alert them to the status of the migration task. The one or more notifications may further describe available details associated with the migration task, such as the particular error which resulted in the updated status and/or any relevant details related to the migration task. In some embodiments, the one or more notifications may be interactable such that users may provide additional feedback regarding the migration task and the received feedback may be collected and used as migration metadata. For example, if the "failed" status was determined by a user to occur due to an inaccurate determination of migration task dependency (e.g., the current migration task cannot be completed because it depends on a migration task that is not yet complete), the user may provide this feedback, which can be used to update the current hierarchical ordering and dynamic prioritized list of migration tasks and used to as training data for one or more models (e.g., migration determination model, task prioritization determination model, dependency determination, and/or output model).

Figure 7A:
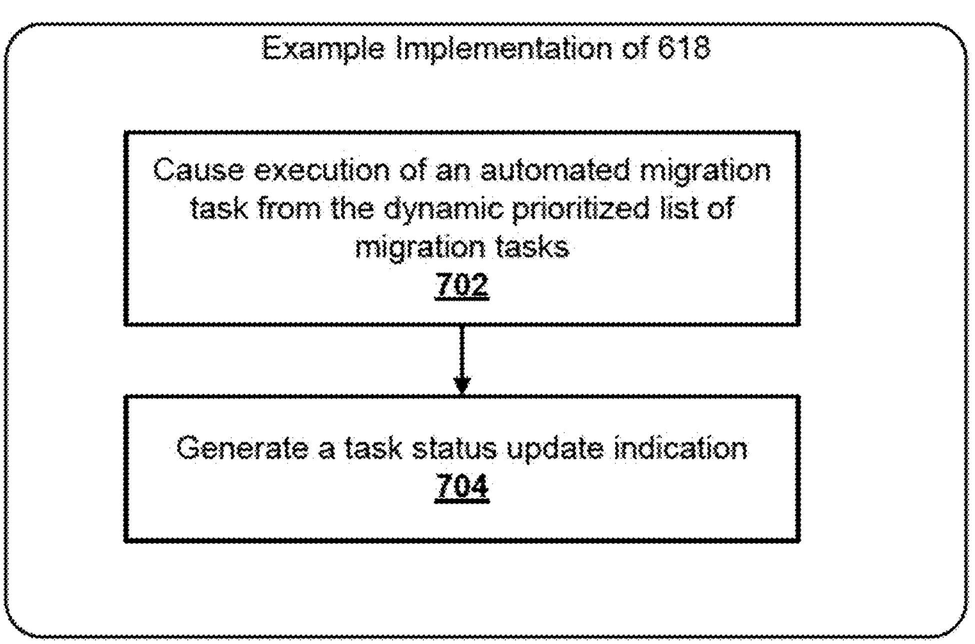
FIG. 7A illustrates an example flowchart for providing a dynamic prioritized list of migration tasks, in accordance with some example embodiments described herein.

In some embodiments, operation 618 may be performed by operations described in FIG. 7A. As shown by operation 702, the apparatus 200 includes means, such as processor 202, communications hardware 206, migration engine 210, or the like, for causing execution of an automated migration task from the dynamic prioritized list of migration tasks. As mentioned above, automated migration tasks may be tasks that do not require continual input from developers or other users but may require an initial configuration and/or activation command. In some embodiments, the automated migration tasks may be automatically executed without the need for any manual input (e.g., no requirement for an initial configuration and/or activation command).

In some embodiments, automated migration tasks may be associated with computer executable code such that migration engine 210 may execute an automated migration task based on the associated executable code. In some embodiments, the computer executable code may be partially complete and may require the migration engine 210 to determine code snippets and/or values for missing data. For example, an automated migration task may refer to testing an application component within a test platform. The automated migration task may be associated with a function that contains default code as well as an application component location variable. As such, the migration engine 210 may automatically determine an input the application component location for the application component location variable and then execute the associated code to automatically perform the migration task. Alternatively, the migration engine 210 may prompt a user to select the application component location for the application component location variable and then execute the associated code to automatically perform the migration task.

As shown by operation 704, the apparatus 200 includes means, such as processor 202, communications hardware 206, migration engine 210, or the like, for generating a task status update indication. Once the migration engine 210 has caused the execution of an automated migration task, the migration engine 210 may generate a task status update indication for the automated migration task. The task status update indication may indicate a "complete" status if the migration task was successfully executed, an "in progress" status if the migration task is currently being executed, a "failed" status if the migration task was not successfully executed, an "intervention needed" status if the migration task requires user input.

Figure 7B:
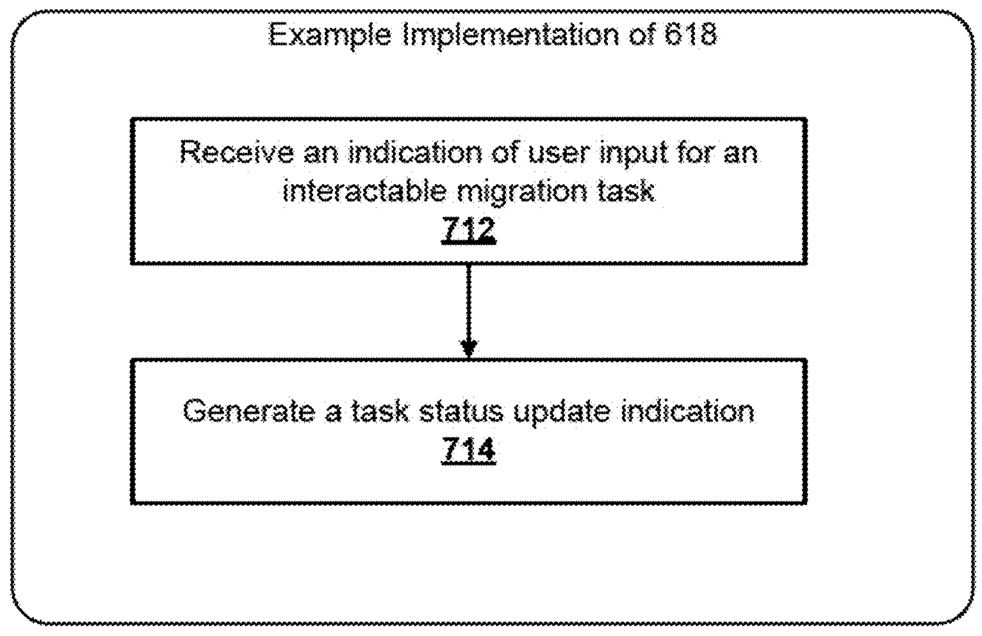
FIG. 7B illustrates an example flowchart for providing a dynamic prioritized list of migration tasks, in accordance with some example embodiments described herein.

Additionally or alternatively, in some embodiments, operation 618 may be performed by operations described in FIG. 7B. As shown by operation 712, the apparatus 200 includes means, such as processor 202, communications hardware 206, migration engine 210, or the like, for receiving an indication of user input for an interactable migration task. As mentioned above, interactable tasks may require user interaction beyond an initial configuration and activation. For example, user interactable tasks may require the user to perform the particular migration task manually.

In some embodiments, the indication of user input may be received in response to user interaction with the dynamic prioritized list of migration tasks. For example, an interactable migration task may be displayed to an authorized user via an associated user device and the user may manually perform the described migration task. Once complete, the user may interact with the dynamic prioritized list of migration tasks to update the status of the interactable migration task (e.g., selecting a status from a drop-down menu, manual entry, checking a status box, etc.).

As shown by operation 714, the apparatus 200 includes means, such as processor 202, communications hardware 206, migration engine 210, or the like, for generating a task status update indication. Once the migration engine 210 has received an indication of user input for a migration task, the migration engine 210 may generate a task status update indication for the interactable migration task. The task status update indication may indicate a "complete" status if the migration task was successfully completed, an "in progress" status if the migration task is currently being executed, a "failed" status if the migration task was not successfully executed, an "intervention needed" status if the migration task requires user input.

Figure 5:
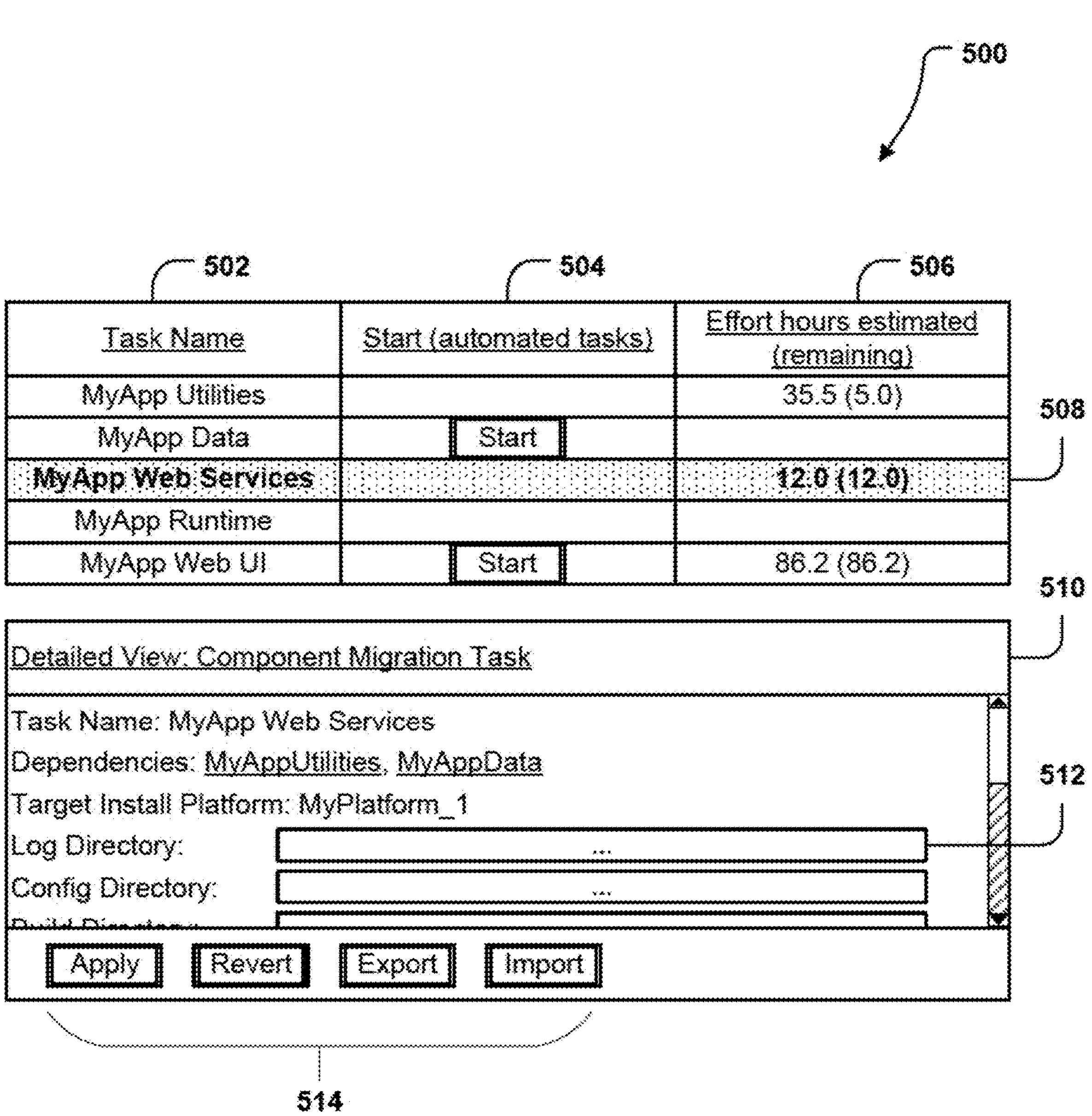
FIG. 5 illustrates an example user interface used in some example embodiments described herein.

Turning to FIG. 5, a graphical user interface 500 (GUI) is provided that illustrates the prioritized list of migration tasks with interactable elements. As noted previously, a user may interact with the application migration system 102 by directly engaging with communications hardware 206 of an apparatus 200 comprising a system device 104 of the application migration system 102. In such an embodiment, the GUI 500 shown in FIG. 5 may be displayed to a user by the apparatus 200. Alternatively, a user may interact with the application migration system 102 using a separate user device (e.g., any of user device 110A through user device 110N, as shown in FIG. 1), which may communicate with the application migration system 102 via communications network 108. In such an embodiment, the GUI 500 shown in FIG. 5 may be displayed to the user by the user device 110.

The GUI 500 includes an example task list with three example columns, the task name column 502, start buttons column 504, and effort hours estimated column 506. In some embodiments, different columns may be displayed, either as configured by the user or pre-determined by default. The task name column 502 is depicted showing the names of the five example tasks depicted in FIGS. 3-4. The start buttons column 504 shows user interface start buttons for automated tasks that allow user input to begin an automated task. The effort hours estimated column 506 provides an estimate of the number of the complexity of a migration task in terms of the number of hours of effort required by administrators, developers, or others working on the migration task, as well as a number of remaining hours for tasks that are in progress. The migration task list may be selected, as shown by the selected item 508, highlighting the item and displaying details in the detailed view 510. The detailed view 510 includes a title pane and a detail pane with various details about the selected migration task. Certain detail elements of the selected task, such as user interactable task detail 512, may be provided in the detailed view mode for the selected migration task, such as the log directory, as depicted in FIG. 5.

For automated migration tasks, the migration engine 210 may cause execution of the automated migration tasks, for example, following a user confirmation such as an interface button marked "start" from GUI 500. The migration engine 210 may transmit, via communications hardware 206, the command to begin automated migration to one or more host devices 112A-112N, where various scripts or other automated processes may begin the automated migration task.

Returning now to FIG. 6B, as shown by operation 620, the apparatus 200 includes means, such as processor 202, communications hardware 206, migration engine 210, or the like, for updating the dynamic list of prioritized migration tasks. In some embodiments, the migration engine 210 may update the dynamic list of prioritized migration tasks based on the one or more task status update indications. Once migration engine 210 receives a task status update indication, the migration engine 210 may determine whether a status for a migration task is complete and if so, may update the dynamic prioritized list of migration tasks. As mentioned above, the dynamic prioritized list of migration tasks may include an ordered sequence of a subset of migration tasks. Once a migration task of the dynamic prioritized list of migration tasks is determined to be completed (e.g., as indicated by a "complete" status), the migration engine may process the remaining migration tasks (e.g., migration tasks that are not associated with a "complete" status) to determine an updated ordered subset of migration tasks.

Once the migration engine 210 updates the dynamic prioritized list of migration tasks, the migration engine 210 may return to operation 616, where the dynamic prioritized list of migration tasks is provided to one or more users. This process may repeat iteratively until all migration tasks within the dynamic prioritized list of migration tasks are associated with a "complete" status. As such, the dynamic prioritized list of migration tasks provides users with a complete overview of current tasks such that users are able to effectively prioritize migration tasks, which are automatically determined, thus saving valuable computational and manual resources.

Figure 4B:
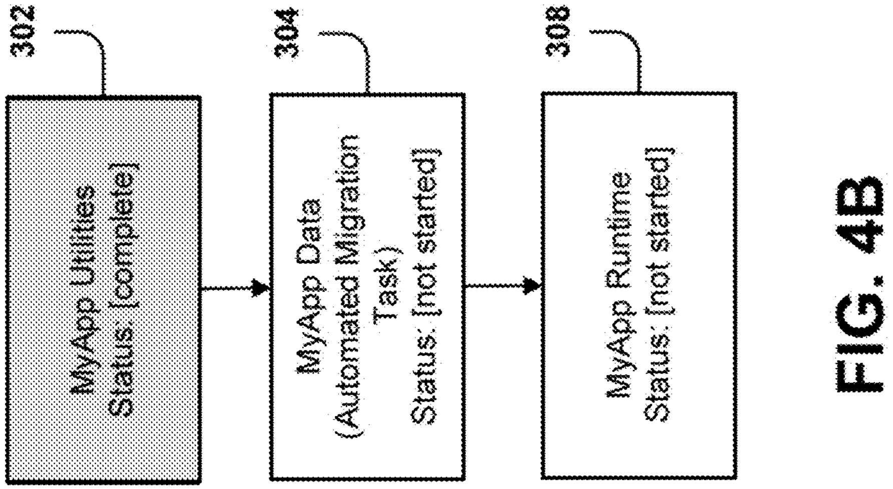
FIG. 4B illustrates an example dynamic prioritized list of migration tasks for migrating application components used in some example embodiments described herein.
Figure 4A:
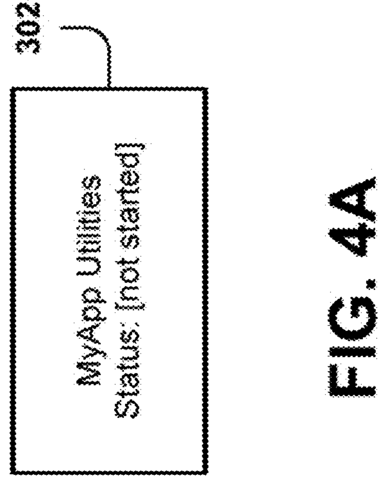
FIG. 4A illustrates an example dynamic prioritized list of migration tasks for migrating application components used in some example embodiments described herein.

Turning to FIGS. 4A-4D, example depictions of a dynamic prioritized list of migration tasks is shown for migrating application components of the example application "MyApp" previously depicted in connection with FIG. 3A. As shown in FIG. 4A, the dynamic prioritized list of migration tasks may initially include the migration task MyApp Utilities 302, which has not been started as indicated by the "not started" status. The migration task MyApp Utilities 302 may be the only migration task listed in the dynamic prioritized list of migration tasks as all other migration tasks are dependent on migration task MyApp Utilities 302.

As shown in FIG. 4B, the dynamic prioritized list of migration tasks may be updated to include migration tasks MyApp Data 304 and migration task MyApp Runtime 308, both of which have not been started as indicated by the "not started" status. Once a task status update indication has been received for migration task MyApp Utilities 302 which describes an updated task status of "complete", the dynamic prioritized list of migration tasks may update the status of MyApp Utilities 302 to "complete" and process the remaining migration tasks and associated task priority scores and hierarchical ordering to update the dynamic prioritized list of migration tasks. Thus, the dynamic prioritized list of migration tasks may be updated to include the migration task MyApp Data 304 in the first position followed by the migration task MyApp Runtime 306 because both migration tasks depend only on a migration task that has a "complete" status and migration task MyApp Data 304 is associated with a higher task priority score than migration task My App Runtime 306.

Figure 4D:
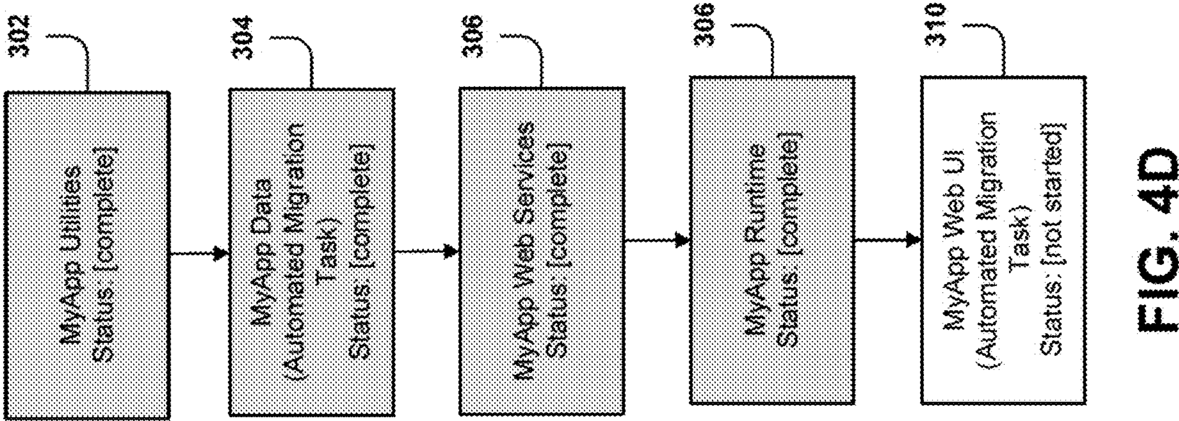
FIG. 4D illustrates an example dynamic prioritized list of migration tasks for migrating application components used in some example embodiments described herein.
Figure 4C:
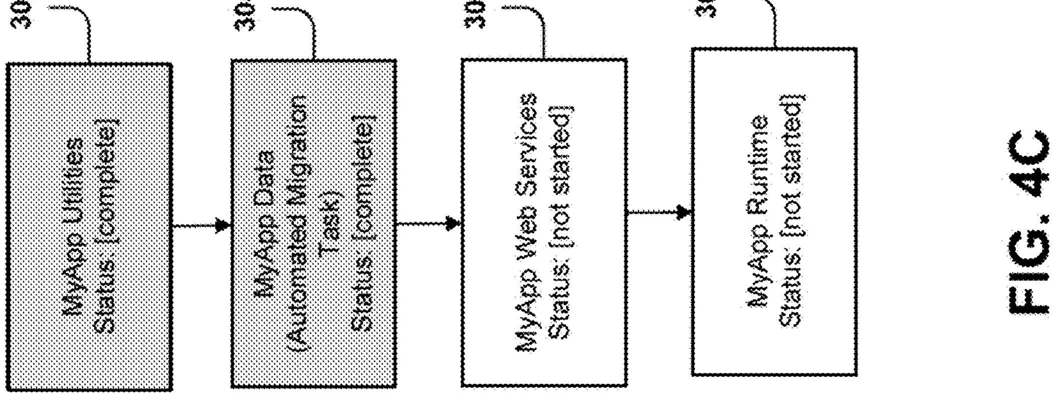
FIG. 4C illustrates an example dynamic prioritized list of migration tasks for migrating application components used in some example embodiments described herein.

As shown in FIG. 4C, the dynamic prioritized list of migration tasks may be updated to include migration task MyApp Web Services 406 which has not been started as indicated by the "not started" status. Once a task status update indication has been received for migration task MyApp Data 304 which describes an updated task status of "complete", the dynamic prioritized list of migration tasks may update the status of migration task MyApp Data 304 to "complete" and process the remaining migration tasks and associated task priority scores and hierarchical ordering to update the dynamic prioritized list of migration tasks. Here, since migration task MyApp Web Services 306 is dependent upon migration task MyApp Data 304, which is dependent on MyApp Utilities 302 and these migration tasks are associated with a "complete" status, migration task MyApp Web Services 306 is not available and is associated with a higher task priority than migration task MyApp Runtime 306. Thus, the dynamic prioritized list of migration tasks may be updated to include the migration task MyApp Web Services 306 in the first position followed by the migration task MyApp Runtime 306.

Finally, As shown in FIG. 4D, the dynamic prioritized list of migration tasks may be updated to include migration task MyApp Web UI 310 which has not been started as indicated by the "not started" status. Once a task status update indication has been received for migrations task MyApp Web Services 306 and migration task MyApp Runtime 308, which describe an updated task status of "complete", the dynamic prioritized list of migration tasks may update the status of these migration tasks to "complete" and process the remaining migration tasks and associated task priority scores and hierarchical ordering to update the dynamic prioritized list of migration tasks. Thus, the dynamic prioritized list of migration tasks may be updated to include the migration task MyApp Web UI 310, which is dependent on MyApp Web Services 306 and migration task My App Runtime 308.

Although the above figures illustrate the dynamic prioritized list of migration tasks to include migration tasks with a "complete" status, it will be appreciated that this is for illustrative purposes and the dynamic prioritized list of migration tasks may or may not include migration tasks associated with a "complete" status. Similarly, while the above figures do not illustrate the dynamic prioritized list of migration tasks to include migration tasks which are not yet interactable or executable, it will be appreciated that this is for illustrative purposes and the dynamic prioritized list of migration tasks may or may not include such migration tasks.

Returning to FIG. 6B, as shown by operation 622, the apparatus 200 may include means, such as, memory 204, training engine 214, or the like, for storing migration metadata. The migration metadata may be data collected during execution of migration tasks, including data related to the duration of the migration task and costs associated with the migration task, including hardware, software, operations, administration, downtime, and the like. Migration metadata may further include data about the application component being migrated, such as the vendor, licensing of the application component, type of application component, size or other metrics of the codebase, and the like. The training engine 214 may extract and record the training metadata during the execution of one or more migration tasks. For example, the training engine 214 may execute a background process to observe progress made in the completion of a migration task. The observed migration metadata may be stored to memory 204 or other storage for later use as a training dataset. As mentioned above, in some embodiments, the migration metadata is used to train one or more models such as the migration determination model, the task prioritization determination model, the dependency determination model, and/or the output model.

FIGS. 6A-6B and 7A-7B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations described above in connection with 6A-6B and 7A-7B may be modified or further amplified. Furthermore, in some embodiments, additional optional operations may be included. Modifications, amplifications, or additions to the operations above may be performed in any order and in any combination.

As described above, example embodiments provide methods and apparatuses that enable improved migration of applications. Example embodiments thus overcome the difficulties faced by users in manually tracking and manually intervening in a large number of tasks during the migration of applications to new platforms. Example embodiments also enable migration of individual application components, rather than entire applications, enabling more flexible workflows where dependencies can be more precisely defined and migration targets evaluated at a more granular level. Finally, example embodiments may enable users to fully consider a more comprehensive set of input data when computing task priority scores by incorporating application inventory data, task migration metadata, organizational data, or the like.

As these examples all illustrate, example embodiments contemplated herein provide technical solutions that solve real-world problems faced during application migration. While a need to facilitate the migration of applications has existed for as long as large-scale computing, recent advances in machine learning, and experience in performing application migrations have enabled the development of new solutions to the problem. The use of an application discovery engine, the structuring of migration tasks into directed graphs and prioritized lists, and other elements of example embodiments described herein all represent ways to overcome these and other problems faced in application migration.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating a dynamic prioritized list of migration tasks for an application, the method comprising:

identifying, by an application discovery engine and for the application, a set of application components;

generating, by a migration engine, a set of the migration tasks based on the set of application components wherein the set of the migration tasks comprises an interactable migration task, an automated migration task, and a dependent migration task depending on the interactable migration task;

determining, by a task prioritization analysis engine, a task priority score for each item in the set of the migration tasks;

determining, by the migration engine, a hierarchical ordering for the set of the migration tasks;

generating, by the migration engine and based on the hierarchical ordering and the task priority score, the dynamic prioritized list of the migration tasks, wherein the dynamic prioritized list of the migration tasks comprises an ordered sequence of a subset of the migration tasks;

receiving, by communications hardware, a task status update indication, wherein the task status update indication corresponds to the interactable migration task and comprises a status update relating to the interactable migration task and the dependent migration task;

generating an updated status of the dependent migration task based on the task status update indication;

updating, by the migration engine and based on the task status update indication, the dynamic prioritized list of the migration tasks to produce an updated dynamic prioritized list of the migration tasks comprising the updated status of the dependent migration task; and executing, using the updated dynamic prioritized list of the migration tasks, the set of migration tasks.

2. The method of claim 1, further comprising:

generating, by the migration engine and based on the set of migration tasks, a directed graph of the migration tasks, wherein each node of the directed graph of the migration tasks corresponds to a migration task in the set of the migration tasks and each edge of the directed graph of the migration tasks corresponds to a migration task dependency relationship between connected nodes, wherein the hierarchical ordering is determined based on the directed graph of the migration tasks.

3. The method of claim 1, further comprising:

receiving, by communications hardware, one or more additional task status update indications, wherein each additional task status update indication corresponds to a migration task of the set of the migration tasks and comprises an additional status update relating to the corresponding migration task; and updating, by the migration engine and based on the one or more additional task status update indications, the dynamic prioritized list of the migration tasks.

4. The method of claim 1, further comprising:

storing, by a training engine, migration metadata based on the task status update indication.

5. The method of claim 4, further comprising:

training, using the migration metadata, one or more of a migration determination model, a task prioritization determination model, a dependency determination model, or an output model.

6. The method of claim 1, wherein the task priority score for each item of the set of the migration tasks is determined based on a list of factors, the list of factors describing a readiness of a particular application component to be migrated to a target platform.

7. The method of claim 6, wherein the list of factors comprises an assessment of risk involved in migrating the particular application component to the target platform.

8. The method of claim 1, wherein identifying the set of application components further comprises:

causing execution, by the application discovery engine, of one or more application discovery tools; and receiving, by the communications hardware, application inventory data, wherein identifying the set of application components is based on the application inventory data.

9. The method of claim 1, wherein application components of a respective application are identified with application component types from a list of candidate application component types, the list of candidate application component types comprising:

application code snippet, application function, application programming interface element, sub-applications, and a complete application.

10. The method of claim 1, wherein the set of the migration tasks comprises one or more of (i) testing a candidate application component on a target platform or (ii) migrating the candidate application component to the target platform.

11. The method of claim 1, further comprising:

receiving, by the communications hardware, an indication of user input for the interactable migration task; and generating, by the communications hardware, the task status update indication corresponding to the interactable migration task and the status update based on the indication of user input for the interactable migration task.

12. The method of claim 1, further comprising:

causing execution, by the migration engine, of the automated migration task; and generating, by the migration engine, a task status update indication corresponding to the automated migration task and a status update based on a result of the execution of the automated migration task.

13. The method of claim 1, further comprising providing, by the communications hardware, the dynamic prioritized list of the migration tasks.

14. The method of claim 1, further comprising:

displaying, by the communications hardware, a graphical user interface (i) depicting the dynamic prioritized list of the migration tasks and (ii) comprising interactable elements causing execution of the automated migration task; and modifying, by the communications hardware, the graphical user interface based on the updated dynamic prioritized list of the migration tasks and the updated status.

15. An apparatus for generating a dynamic prioritized list of migration tasks for an application, the apparatus comprising:

an application discovery engine configured to identify, for the application, a set of application components;

a migration engine configured to generate a set of the migration tasks based on the set of application components wherein the set of the migration tasks comprises an interactable migration task, an automated migration task, and a dependent migration task depending on the interactable migration task; and a task prioritization analysis engine configured to determine a task priority score for each item in the set of the migration tasks, wherein the migration engine is further configured to:

determine a hierarchical ordering for the set of the migration tasks, and generate, based on the hierarchical ordering and the task priority score, the dynamic prioritized list of migration tasks, wherein the dynamic prioritized list of migration tasks comprises an ordered sequence of a subset of migration tasks;

communications hardware configured to:

receive a task status update indication, wherein the task status update indication corresponds to the interactable migration task and comprises a status update relating to the interactable migration task and the dependent migration task;

wherein the migration engine is further configured to:

generate an updated status of the dependent migration task based on the task status update indication, update, based on the task status update indication, the dynamic prioritized list of migration tasks to produce an updated dynamic prioritized list of migration tasks comprising the updated status of the dependent migration task; and execute, using the updated dynamic prioritized list of the migration tasks, the set of migration tasks.

16. The apparatus of claim 15, wherein the migration engine is further configured to:

generate, based on the set of migration tasks, a directed graph of migration tasks, wherein each node of the directed graph of migration tasks corresponds to a migration task in the set of migration tasks and each edge of the directed graph of migration tasks corresponds to a migration task dependency relationship between connected nodes, wherein the hierarchical ordering is determined based on the directed graph of migration tasks.

17. The apparatus of claim 15, wherein the communications hardware is further configured to:

receive one or more additional task status update indications, wherein each additional task status update indication corresponds to a migration task of the set of migration tasks and comprises an additional status update relating to the corresponding migration task, wherein the migration engine is further configured to update, based on the one or more additional task status update indications, the dynamic prioritized list of migration tasks.

18. The apparatus of claim 15, further comprising a training engine configured to store migration metadata based on the task status update indication.

19. The apparatus of claim 18, wherein the migration metadata is used to train one or more of a migration determination model, a task prioritization determination model, a dependency determination model, or an output model.

20. A computer program product for generating a dynamic prioritized list of migration tasks for an application, the computer program product comprising at least one non-transitory computer-readable storage medium storing software instructions that, when executed, cause an apparatus to:

identify, for the application, a set of application components;

generate a set of the migration tasks based on the set of application components wherein the set of the migration tasks comprises an interactable migration task, an automated migration task, and a dependent migration task depending on the interactable migration task;

determine a task priority score for each item in the set of the migration tasks;

determine a hierarchical ordering for the set of the migration tasks;

generate, based on the hierarchical ordering and the task priority score, the dynamic prioritized list of the migration tasks, wherein the dynamic prioritized list of the migration tasks comprises an ordered sequence of a subset of the migration tasks;

receive a task status update indication, wherein the task status update indication corresponds to the interactable migration task and comprises a status update relating to the interactable migration task and the dependent migration task;

generate an updated status of the dependent migration task based on the task status update indication;

update, based on the task status update indication, the dynamic prioritized list of the migration tasks to produce an updated dynamic prioritized list of the migration tasks comprising the updated status of the dependent migration task; and execute, using the updated dynamic prioritized list of the migration tasks, the set of migration tasks.

* * * * *